Jan. 18, 1949.     H. G. A. BAX     2,459,486
POWER SUPPLY SYSTEM
Filed Dec. 4, 1946
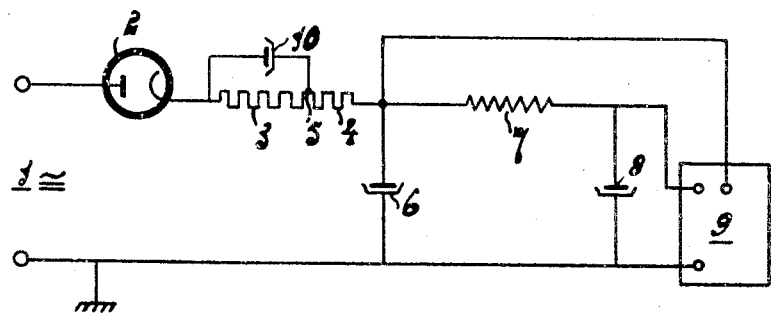
HENDRIKUS GERARDUS ALPHONSUS BAX
INVENTOR
ATTORNEY Patented Jan. 18, 1949

2,459,486

UNITED STATES PATENT OFFICE 2,459,486

POWER SUPPLY SYSTEM

Hendrikus Gerardus Alphonsus Bax, Eindhoven, Netherlands, assignor to Hartford National Bank and Trust Company, Hartford, Conn., as trustee Application December 4, 1946, Serial No. 714,092
In the Netherlands September 28, 1945

Section 1, Public Law 690, August 8, 1946
Patent expires September 28, 1965

5 Claims. (Cl. 171—97)

1

The invention relates to a power supply system for feeding filtered direct current to a load, said system being adapted for operation on either direct-current supply lines or alternating-current supply lines. It is known to include in such an A. C./D. C. power supply system, in series with the line terminals, a rectifying tube, a resistance and a filter condenser (to which the load resistance is connected in parallel). The object of including the said series-resistance is to limit the charging-current pulses of the said filter condenser; without the use of this resistance the rectifying tube could be seriously damaged by the charging-current pulses. This particularly applies in the case of connection to lines of comparatively high voltage, such as a 220 volts line, since in the said A. C./D. C. power supply systems use is made, as a rule, of rectifying tubes having a comparatively low internal resistance, in contra-distinction to power supply systems which are connected only to the alternating current line (usually via a transformer). In the A. C. type power supply systems use is made of rectifying tubes having a comparatively high internal resistance, the internal resistance of the tube performing the function of the series-resistance.

It is furthermore known that this series-resistance, in the case of connection to alternating current lines, acts upon the direct voltage set up across the filter condenser in a manner different from that in the case of connection to direct current lines, since in the latter case the resistance brings about a smaller voltage drop across the condenser than in the case of connection to alternating current lines.

The A. C./D. C. power supply system as described has the drawback that, for given values of the series-resistance and of the load resistance, a fixed ratio exists between the direct voltage set up across the filter condenser in the case of connection to alternating current lines and the corresponding voltage occurring in the case of connection to direct current lines.

The object of the invention is to provide a simple arrangement which permits of adjusting the said direct voltages, within certain limits, independently of one another and of varying the said ratio at will.

According to the invention, part of the said resistance is shunted with respect to alternating current and direct current respectively.

This may be accomplished by shunting part of the resistance by means of a condenser, preferably an electrolytic condenser, or a choke respectively.

The part of the resistance which is not shunted is effectively given at least the value of the series-resistance prescribed for the rectifying tube employed. The value of this resistance is furthermore dependent on the value of the filter condenser and on the value of the line voltage.

The invention will be explained more fully with reference to the accompanying drawing, showing, by way of example, one form of the circuit-arrangement according thereto.

In the sole figure of the drawing reference numeral 1 designates the line connecting terminals. In series with these terminals are connected a half-wave rectifying tube 2, a resistance 5 consisting of two parts 3 and 4, and a filter condenser 6. The series-connection of a choke 7 and a second filter condenser 8 is parallel to the condenser 6. A load 9 is fed both from the filter condenser 6 and from the filter condenser 8.

Load 9 may be in the form of a radio receiver whose power output stage is energized by the voltage established across filter condenser 6 and whose other stages are energized by the lower voltage established across condenser 8.

According to the invention, the portion 3 of the series-resistance 5 is shunted for alternating current by an electrolytic by-pass condenser 10 (this condenser need be suitable for only a low voltage). The portion 3 of the series resistance is now effectively short-circuited when the system is connected to an alternating-current line so that the direct voltage established across filter condenser 6 is greater than would be attained in the absence of said by-pass condenser. However, when the system is connected to a direct-current line, the by-pass condenser 10 has no effect on the direct output voltage. The use of this measure permits the direct voltages set up across condenser 5 in the case of connection to alternating current lines and to direct current lines to be adjusted at will and independently of one another within certain limits. Resistance 4 preferably has at least the value of the series-resistance prescribed for the rectifying tube 2. The value of this series-resistance is, for example, for the rectifying tube UY 21, at a mains voltage of 170 to 250 volts and a filter condenser of 32µf, 125 ohms.

The greater freedom in proportioning the present circuit-arrangement, obtained by the application of the invention, is particularly advantageous if it is desired to limit the direct voltage set up across the first smoothing condenser in the case of connection to direct current mains (more particularly to the 220 volts lines). Such voltage limitation is obtainable in a simple manner by giving the series-resistance 5 a properly chosen value. It may occur, however, that the direct voltage set up across condenser 6 in the case of connection to alternating current lines of a corresponding voltage value becomes unduly low also in view of the value of the load resistance to be connected. Now, according to the invention, by partly shunting the series-resistance with respect to alternating current it can be ensured that the value of the said voltage in the case of connection to the alternating current lines is the same or substantially the same as in the case of connection to the direct current lines concerned.

If the invention were not used, a particular switch would be required which short-circuits part of the series-resistance in the case of connection to alternating current lines. This is very undesirable, however, since the aim is to provide a power supply system which is adapted for connection to either direct current or alternating current lines, in such manner that they can be connected to either lines (provided they have about the same voltage value) without entailing change-over operations.

If the voltage limitation by means of resistance 5 would lead to a decrease of the direct voltage set up across the condenser 6 in the case of connection to the direct current lines relative to that which occurs in the case of connection to the alternating current lines, part of the series-resistance may be shunted with respect to direct current by means of a choke. The choke is designed to have a low internal direct-current resistance and to offer a considerable reactance to alternating current so that portion 3 of the series resistance is effectively short circuited only when the system is connected to a direct-current line.

The part of the series-resistance which is not shunted may be formed completely or in part by the internal resistance of the rectifying tube.

What I claim is:

1. A power supply for furnishing a filtered direct voltage to a load and adapted for connection to the terminals of an alternating current or direct current line, said power supply comprising a rectifying device, a resistance, a filter capacitance, said device being connected in series with said resistance and said capacitance to said line terminals, and a reactance element shunted across a portion of said resistance, the shunted and unshunted portions of said resistance having respective values at which a predetermined ratio exists between the direct voltage established across said load in the case of connection to an alternating current line and the corresponding voltage in the case of connection to a direct current line.

2. A power supply for furnishing a filtered direct voltage to a load and adapted for connection to the terminals of an alternating current or direct current line, said power supply comprising a rectifying device, a resistance, a filter capacitance, said device being connected in series with said resistance and said capacitance to said line terminals, and a by-pass condenser shunted across a portion of said resistance, the shunted and unshunted portions of said resistance having respective values at which a predetermined ratio exists between the direct voltage established across said load in the case of connection to an alternating current line and the corresponding voltage in the case of connection to a direct current line.

3. A power supply for furnishing a filtered direct voltage to a load and adapted for connection to the terminals of an alternating current or direct current line, said power supply comprising a rectifying device, a resistance, a filter capacitance, said device being connected in series with said resistance and said capacitance to said line terminals, and a choke shunted across a portion of said resistance, the shunted and unshunted portions of said resistance having respective values at which a predetermined ratio exists between the direct voltage established across said load in the case of connection to an alternating current line and the corresponding voltage in the case of connection to a direct current line, said choke offering a relatively high resistance to alternating current and a low resistance to direct current.

4. A power supply for furnishing a filtered direct voltage to a load and adapted for connection to the terminals of an alternating current direct current line, said power supply comprising a rectifying device, a resistance, a filter capacitance, said device being connected to series with said resistance and said capacitance to said line terminals, and a by-pass condenser shunted across a portion of said resistance, the shunted and unshunted portions of said resistance having values at which substantially the same magnitude of direct voltage is established across said load both in the case of connection to an alternating current line and in the case of connection to a direct current line.

5. A power supply for furnishing a filtered direct voltage to a load and adapted for connection to the terminals of an alternating current or direct current line, said power supply comprising a rectifier tube having a low internal resistance, a resistance element, a filter capacitance, said tube being connected in series with said element and said capacitance to said line terminals, and a by-pass condenser shunted across a portion of said resistance element, the unshunted portion of said element having a value substantially equal to the internal resistance of said tube, the shunted portion of said element having a value at which substantially the same magnitude of direct voltage is established across said load both in the case of connection to an alternating current line and in the case of connection to a direct current line.

HENDRIKUS GERARDUS ALPHONSUS BAX.

No references cited.